(12) United States Patent
Dimitri et al.

(10) Patent No.: US 6,697,214 B2
(45) Date of Patent: Feb. 24, 2004

(54) REMOVABLE DISK DRIVE WITH SEPARABLE ELECTRICAL AND MECHANICAL COMPONENTS

(75) Inventors: Kamal Emile Dimitri, Tucson, AZ (US); Robert George Emberty, Tucson, AZ (US); Craig Anthony Klein, Tucson, AZ (US); Daniel James Winarksi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 09/844,032

(22) Filed: Apr. 26, 2001

(65) Prior Publication Data

US 2002/0159188 A1 Oct. 31, 2002

(51) Int. Cl.$^7$ .............................................. G11B 5/012
(52) U.S. Cl. ..................... 360/97.01; 361/685; 360/92
(58) Field of Search ................ 360/97.01, 97.03, 360/137, 92; 361/684, 685

(56) References Cited

U.S. PATENT DOCUMENTS

| | | | |
|---|---|---|---|
| 4,285,018 A | | 8/1981 | Mulvany et al. |
| 4,639,863 A | | 1/1987 | Harrison et al. |
| 4,811,275 A | * | 3/1989 | Balogh et al. ............... 710/316 |
| 5,029,026 A | * | 7/1991 | Stefansky et al. ........ 360/97.02 |
| 5,041,924 A | * | 8/1991 | Blackborow et al. .......... 360/69 |
| 5,097,439 A | * | 3/1992 | Patriquin et al. ............... 711/2 |
| 5,113,297 A | * | 5/1992 | Yoshida ................... 360/99.06 |
| 5,243,495 A | * | 9/1993 | Read et al. .................. 361/685 |
| 5,260,852 A | | 11/1993 | Ma |
| 5,264,975 A | * | 11/1993 | Bajorek et al. ........... 360/97.01 |
| 5,305,180 A | * | 4/1994 | Mitchell et al. ............. 361/685 |
| 5,359,504 A | * | 10/1994 | Ohmi et al. ................. 360/137 |
| 5,491,608 A | * | 2/1996 | Koyanagi et al. ............ 361/685 |
| 5,500,779 A | * | 3/1996 | Diel ......................... 360/97.01 |
| 5,508,860 A | * | 4/1996 | Takagi et al. ............. 360/97.01 |
| 5,726,922 A | * | 3/1998 | Womble et al. .............. 361/726 |
| 5,739,995 A | * | 4/1998 | Ohmi et al. ................. 360/137 |
| 5,757,582 A | | 5/1998 | White et al. |
| 5,822,152 A | * | 10/1998 | Seaver et al. ............. 360/99.08 |
| 5,844,776 A | * | 12/1998 | Yamaguchi et al. ......... 361/684 |
| 6,108,162 A | * | 8/2000 | Amirkiai et al. .......... 360/97.01 |
| 6,480,353 B1 | * | 11/2002 | Sacks et al. .............. 360/97.02 |

FOREIGN PATENT DOCUMENTS

| | | |
|---|---|---|
| JP | 404268282 A | 2/1991 |
| JP | 0062389 | 3/1991 |
| JP | 5189861 A | 7/1993 |

* cited by examiner

Primary Examiner—Brian E. Miller
(74) Attorney, Agent, or Firm—Jean M. Barkley; Bracewell & Patterson, L.L.P.

(57) ABSTRACT

A disk drive has discrete, modular mechanical and electrical devices. The mechanical device includes a casing to which is mounted a drive motor, disks, and an actuator that is driven by a voice coil motor. The actuator supports transducers for interacting with the disks. The electrical device is attached to a backplane and provides various control and data communication functions for the mechanical device with a host computer. In addition, each of the mechanical and electrical components has a mating connector for detachably interfacing with each other.

10 Claims, 2 Drawing Sheets

REMOVABLE DISK DRIVE WITH SEPARABLE ELECTRICAL AND MECHANICAL COMPONENTS

BACKGROUND OF THE INVENTION

1. Technical Field

This invention relates in general to data access and storage devices, and in particular to modular disk drives. Still more particularly, the present invention relates to an array of disk drives that are removable from a backplane, wherein each of the disk drives contains separate mechanical components and the backplane contains an integrated array of electrical components corresponding to the mechanical components.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

A typical HDD also has a movable head stack assembly. Within most HDDs, one magnetic read/write head or slider is associated with each side of each platter and hydrodynamically flies just above the platter's surface. Each read/write head is mounted on a flexible suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the spindle is also mounted. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

For example, an information storage system comprising a magnetic hard disk file or drive 11 for a computer system is shown in FIG. 1. Drive 11 has an outer housing or base 13 containing a plurality of stacked, parallel magnetic disks 15 (one shown) which are closely spaced apart. Disks 15 are rotated by a spindle motor located therebelow about a central drive hub 17. An actuator 21 comprises a plurality of stacked, parallel actuator arms 25 (one shown) in the form of a comb that is pivotally mounted to base 13 about a pivot assembly 23. A controller 19 is also mounted to base 13 for selectively moving the comb of arms 25 relative to disks 15.

In the embodiment shown, each arm 25 typically has extending from it a pair of parallel, cantilevered load beams or suspensions 27, and a head 29 having at least one magnetic read/write head secured to each suspension 27 for magnetically reading data from or magnetically writing data to disks 15. The level of integration called head gimbal assembly is head 29 mounted on suspension 27. Suspensions 27 have a spring-like quality which biases or maintains them in parallel relationship relative to one another. A motor voice coil 31 housed within a conventional voice coil motor magnet assembly (not shown) is also mounted to the comb of arms 25 opposite heads 29. Movement of an actuator driver 33 (indicated by arrow 35) moves heads 29 in an arc across tracks on the disks 15 until the heads 29 settle on the target track. The heads 29 operate in a conventional manner and always move in unison with one another, unless drive 11 uses a split actuator (not shown) wherein the arms move independently of one another.

The individual hard disk drives in, for example, a redundant array of independent drives (RAID) typically receive power through a hard-wired connector interface with a backplane. Each of the drives is loaded in a drive carrier, mounted in a drawer in the storage subsystem, and individually connected in parallel to the backplane. Each drive also has a read/write interface, such as a conventional small computer system interface (SCSI) or Fibre Channel Arbitrated Loop (FC-AL) connector, that allows the host computer to access and store data on the disk drive. All of these elements are combined into an integrated unit that must be serviced as a single entity. Although current hardware designs are acceptable, an improved and more efficient apparatus and method for performing maintenance on the individual disk drives would be desirable.

SUMMARY OF THE INVENTION

In one embodiment of a disk drive of the present invention, the drive is provided with discrete, modular mechanical and electrical devices. The mechanical device includes a casing to which is mounted a drive motor, disks, and an actuator that is driven by a voice coil motor. The actuator supports transducers for interacting with the disks. The electrical device is attached to a backplane and provides various control and data communication functions for the mechanical device with a host computer. In addition, each of the mechanical and electrical components has a mating connector for detachably interfacing with each other.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT BEST MODE FOR CARRYING OUT THE INVENTION

Figure 1:
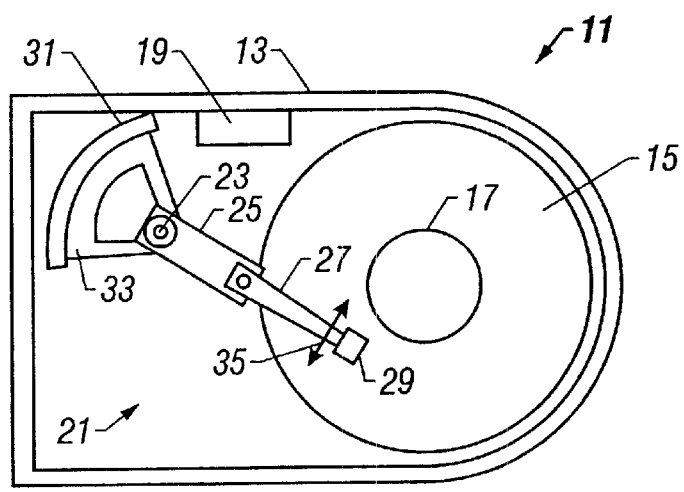
FIG. 1 is a plan view of a prior art hard disk drive.
Figure 2:
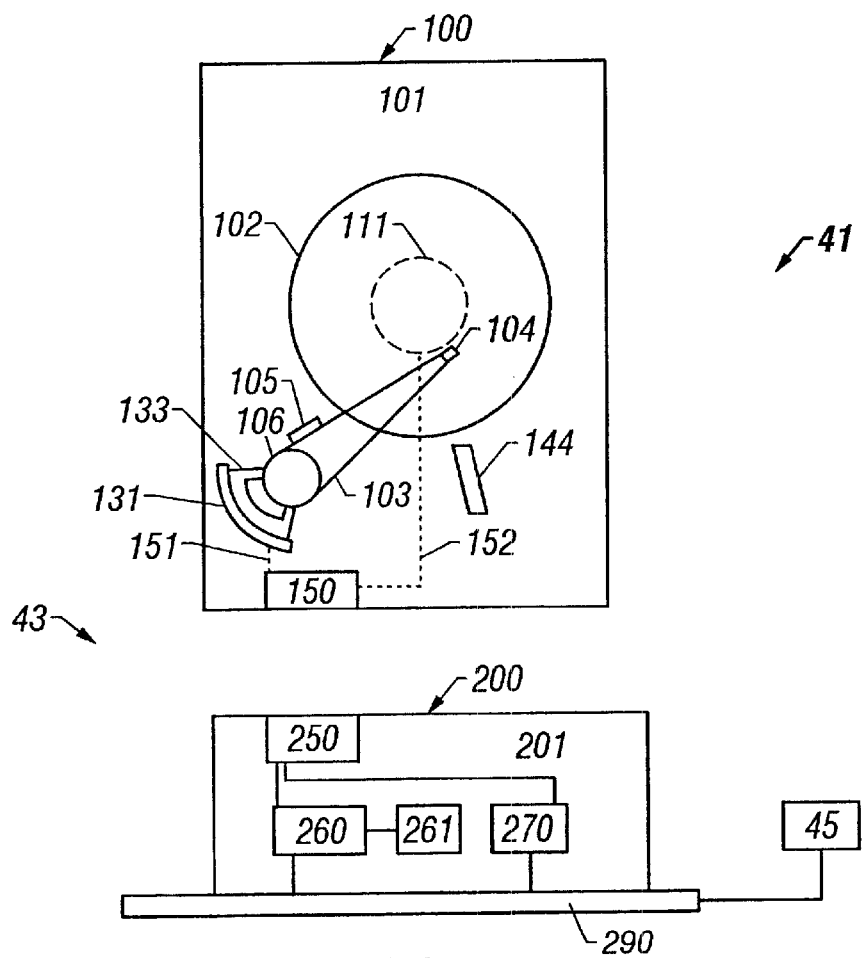
FIG. 2 is a block diagram of an illustrative example of a modular disk drive assembly constructed in accordance with the invention.

Referring now to FIG. 2, a disk drive with separable mechanical and electrical components is shown. For purposes of illustration, a computer data access and storage system such as disk drive storage system 41 is described. However, the system and method of the present invention also may be readily applied to various other systems and components as well, such as consumer electronic applications like digital cameras, digital camcorders, and digital tape recorders, for example.

In the embodiment shown, a data storage subsystem comprises a disk drive library 41 having a plurality or array of detachable, independent disk drive assemblies 43 (one shown). A fully functional disk drive assembly 43 is formed when a mechanical device 100 is mated to an electrical device 200. Mechanical devices 100 are individually sealed and electrical devices 200 are individually packaged. Within a library 41, there are typically many more mechanical devices 100 than there are electrical devices 200, as this saves on the cost of populating every mechanical device 100 with an electrical device 200 when, in fact, mechanical devices 100 are only used periodically. For example, one embodiment of library 41 may comprise two, three, or more mechanical devices 100 for each electrical device 200.

Each mechanical device 100 has primarily mechanical elements, and each electrical card or device 200 has primarily electrical elements, including a drive buffer and a read/write channel. When mechanical device 100 and electrical device 200 are removably connected a fully functional hard disk drive results. Mechanical device 100 includes an external housing or casing 101 that serves as a base for supporting and protecting the other elements. In the version shown, a drive motor 111 is mounted to casing 101 along with one or more disks 102 which are rotated by drive motor 111. Alternatively, drive motor 111 may be mounted to electrical device 200 to further reduce the cost and weight of mechanical device 100, but this is not the preferred embodiment.

An actuator 103 is also pivotably mounted to casing 101 on a pivot assembly 106, and is driven by a voice coil motor 131. Actuator 103 comprises a comb-like plurality of stacked, parallel actuator arms (one shown). Voice coil motor 131 is housed within a conventional voice coil motor magnet assembly (not shown) that is opposite a set of transducers or head gimbal assemblies 104. Movement of an actuator driver 133 moves transducers on actuator 103 in an arc across tracks on the disks 102 until the heads settle on the target track. Transducers 104 may be magneto-resistive (MR), giant magnetoresistive (GMR), magnetic tunnel junction (MTJ), or magneto-optical (MO) transducers, for example. Preferably, there is one transducer 104 for each side of each disk 102 that contains data or servo information. The output data read from disks 102 by transducers 104 is pre-amplified by an arm electronics chip 105. In one version, arm electronics chip 105 has a capacitor and a resistor immediately outside of the chip itself. The capacitor and resistor are typically used to tune the arm electronics chip 105 to the specific type of transducer 104.

In addition, mechanical device 100 includes a ramp 144 that is available to unload actuator 103 and, thus, transducers 104 from disks 102 when the disks are not spinning at operational speeds. Ramp 144 assists in preventing head crashes and head stiction with respect to disks 102. In the embodiment shown, mechanical device 100 is also provided with a connector 150 for interfacing with electrical device 200. Connector 150 provides electrical power and operational control signals to drive motor 111 via electrical lines 152. Connector 150 also provides power to voice coil motor 131, and data input/output signals to arm electronics chip 105 and transducers 104 via electrical lines 151.

Again referring to FIG. 2, each electrical device 200 (one shown) is attached to a single backplane 290. Backplane 290 is provided for interfacing with a host computer or processor 45 associated with the data storage system or disk drive library. Electrical device 200 comprises a card that, in the prior art, was integrated as a single unit with mechanical device 100. Thus, in the prior art, electrical device 200 and mechanical device 100 were not separable and required replacement or repair of the complete unit regardless of the nature of such maintenance. However, in the present invention, electrical device 200 is a completely separate element from mechanical device 100.

Electrical and mechanical devices 200, 100 are interconnected by their respective mating connectors 250, 150. Connector 250 provides control and data from an IDE/SCSI chip or controller 260, and memory 261, respectively. In one version, controller 260 has an adaptive transversal filter in its read channel equalizer so that the electronics adapt to the data on each disk 102. Power is provided to connector 250 through power chip 270. Chips 260, 261, 270 and connector 250 are mounted to a printed circuit board 201. Electrical and mechanical devices 200, 100 interface when mechanical device 100 is inserted into electrical device 200.

Figure 4:
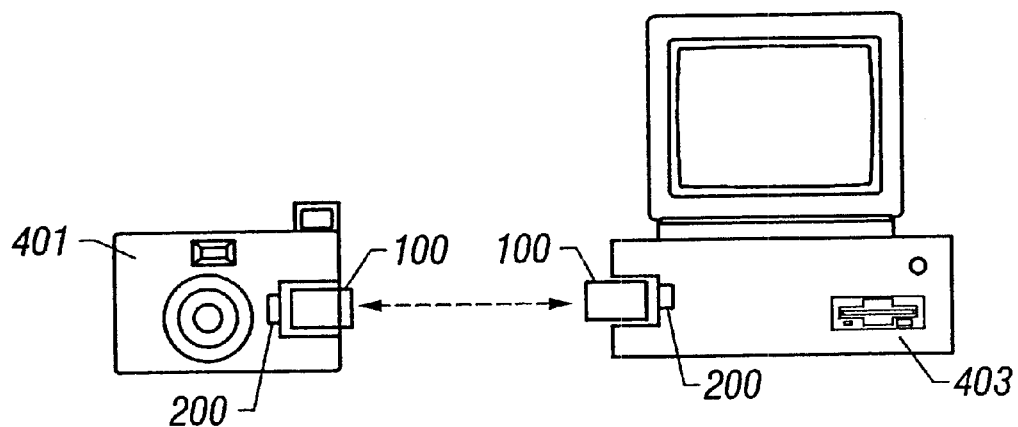
FIG. 4 is a schematic diagram of an alternate embodiment of a modular storage media in operation.

In alternate embodiments, electrical device 200 may be located inside a consumer electronic device, such as a digital camera, camcorder, or tape recorder. For example, in FIG. 4, a digital camera 401 has an electrical device 200 for coupling with a mechanical device 100. The same and/or other mechanical devices 100 can be inserted into a computer 403 having its own electrical device 200. Thus, in this version, mechanical device 100 operates as a data shuttle between two different user systems. Again, the mechanical device 100 would be the only removable part in order to reduce the cost of the removable portion. In addition, by keeping the arm electronics 105, etc., either inside a sealed mechanical enclosure, or inside the camera or other apparatus, exposure to electrostatic discharge (ESD), and organic and inorganic contaminants, which could result in head crashes, are greatly reduced.

Figure 3:
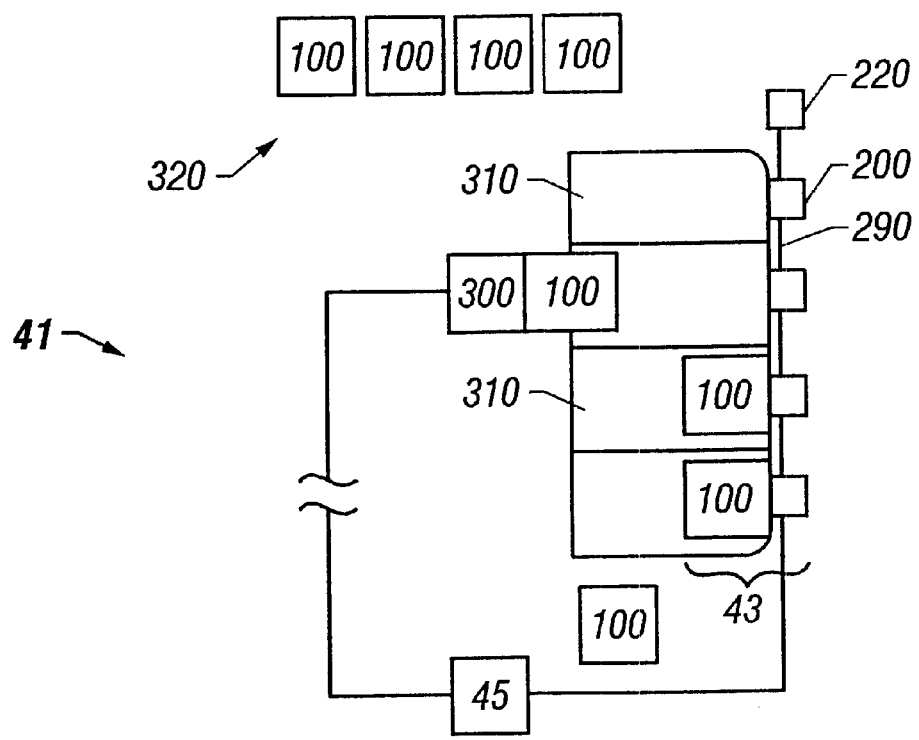
FIG. 3 is a block diagram of an automated disk drive library utilizing the disk drive assemblies of FIG. 2.

In operation (FIG. 3), disk drive library 41 utilizes a plurality of the disk drive assemblies 43 as shown. Library 41 has a movable robotic picking mechanism or picker 300 that selectively handles and moves the mechanical devices 100 with respect to a plurality of library drawers or bins 310 and/or other locations 320. Each disk drive assembly 43 works as described above, with an electrical device 200 mounted to backplane 290, and a detachable mechanical device 100. The host computer 45 controls operations of the disk drive assemblies 43 and picker 300. In addition, library 41 may be provided with an external electrical device 220 for the manual mounting of a mechanical device 100. In this way, external electrical device 220 serves as an external input/output port. Thus, data can be interchanged with library 41 via (a) the internal robotic picker 300 that moves mechanical devices 100 to internal electrical devices 200, or (b) external electrical device 220 whereby a user manually mounts a mechanical device 100 to library 41.

The present invention has many advantages over prior art configurations. The disk drive assemblies of the present invention have separate mechanical and electrical components that interface as a single integrated unit when installed into a backplane on a disk drive library. This invention also may be implemented in various other consumer electronics that utilize data access and storage devices. Since the electrical portion of the disk drive generates most of the total thermal budget for the entire disk drive, separating the electrical portion from the mechanical portion allows cooling and or ventilation to be used more effectively. Moreover, since the mechanical portion produces relatively little heat, it is quite possible to cool it by free convection rather than forced convection, as was required in the prior art.

In a library configuration, separating the components saves the cost of duplicating a plurality of electrical circuit boards or cards. This savings is due to the single integrated backplane providing the electronics for all of the disk drives. In addition, if a card malfunctions, a maintenance worker or robot could remove the bad card from the backplane and insert a new and fully functional card in its place. Furthermore, the electronics of the entire library can be readily upgraded by simply exchanging cards.

While the invention has been shown or described in only some of its forms, it should be apparent to those skilled in the art that it is not so limited, but is susceptible to various changes without departing from the scope of the invention.

What is claimed is:

1. A data storage system, comprising:
    a backplane adapted to interface with a processor;
    an electrical device for a data storage assembly electrically interconnected with the backplane and having a first connector;
    a mechanical device for the data storage assembly having a second connector for detachably coupling with the first connector, and wherein the electrical device provides power to and control of the mechanical device when the mechanical device is coupled thereto;
    an auxiliary data storage assembly having an auxiliary electrical device for coupling with the mechanical device when the mechanical device is detached from said electrical device such that the mechanical device is a data shuttle between the data storage assembly and the auxiliary data storage assembly; and wherein
    the auxiliary data storage assembly is selected from the group consisting of a digital camera a camcorder, and a tape recorder.

2. The data storage system of claim 1 wherein the mechanical device includes an actuator and a storage device each movably mounted to a casing, wherein the actuator has a transducer for reading data from and writing data to the storage device.

3. The data storage system of claim 1 wherein the electrical device includes a controller and memory.

4. The data storage system of claim 1, further comprising a drive motor mounted to one of the electrical device and the mechanical device.

5. A disk drive assembly for a disk drive library, comprising:
    a backplane adapted to interface with a host computer;
    an electrical device for the disk drive assembly electrically interconnected with the backplane, the electrical device having a first connector, a controller, and memory;
    a mechanical device for the disk drive assembly having a second connector for detachably coupling with the first connector internally within the disk drive library, wherein the mechanical device utilizes an actuator and a disk that are each movably mounted to a casing such that the actuator has a transducer for reading data from and writing data to the disk;
    a drive motor mounted to one of the electrical device and the mechanical device for rotating the disk;
    an external electrical device interconnected with the backplane, wherein the mechanical device may be manually coupled to the external electrical device for data interchange external to the disk drive library; and wherein
    the electrical device provides power to and control of the mechanical device when the mechanical device is coupled thereto.

6. A disk drive library, comprising:
    a host computer;
    a backplane for interfacing with the host computer;
    a plurality of electrical devices electrically interconnected with the backplane, each of the electrical devices having a first connector, a controller, and memory;
    a plurality of mechanical devices, each having a second connector for detachably coupling with the first connector, wherein each of the mechanical devices utilizes an actuator and disks that are movably mounted to a casing such that the actuator has transducers for reading data from and writing data to the disks;
    a picking mechanism for manipulating the mechanical devices relative to the electrical devices internally within the disk drive library; and wherein
    an operational hard disk drive assembly is formed when one of the mechanical devices is coupled to one of the electrical devices internally within the disk drive library.

7. The disk drive library of claim 6, further comprising a drive motor mounted to one of the electrical device and the mechanical device of each of the operational hard disk drive assemblies for rotating the disks.

8. The disk drive library of claim 6 wherein a ratio of mechanical devices to electrical devices exceeds two-to-one.

9. The disk drive library of claim 6, further comprising an external input/output port having another electrical device interconnected with the backplane, wherein one of the mechanical devices may be manually coupled to said another electrical device for data interchange external to the disk drive library.

10. The disk drive library of claim 6 wherein the picking mechanism can also replace the electrical devices.

* * * * *